(12) United States Patent
Green

(10) Patent No.: US 10,537,818 B2
(45) Date of Patent: Jan. 21, 2020

(54) REMOTE CONTROL AIRCRAFT RACE LAUNCH PLATFORM

(71) Applicant: James Vincent Green, Bellevue, WA (US)

(72) Inventor: James Vincent Green, Bellevue, WA (US)

(*) Notice: Subject to any disclaimer, the term of this patent is extended or adjusted under 35 U.S.C. 154(b) by 510 days.

(21) Appl. No.: 15/428,060

(22) Filed: Feb. 8, 2017

(65) Prior Publication Data

US 2018/0221781 A1 Aug. 9, 2018

(51) Int. Cl.
| | | |
|---|---|---|
| *A63H 27/14* | (2006.01) | |
| *B64C 39/02* | (2006.01) | |
| *B64F 1/04* | (2006.01) | |
| *G04F 10/00* | (2006.01) | |
| *A63H 27/00* | (2006.01) | |
| *A63K 1/00* | (2006.01) | |
| *A63H 30/04* | (2006.01) | |

(52) U.S. Cl.
CPC ............. *A63H 27/14* (2013.01); *A63H 27/12* (2013.01); *A63H 30/04* (2013.01); *A63K 1/00* (2013.01); *B64C 39/024* (2013.01); *B64F 1/04* (2013.01); *G04F 10/00* (2013.01); *B64C 2201/12* (2013.01)

(58) Field of Classification Search
CPC .......... B64C 39/024; B64F 1/04; B64F 1/007; B64F 1/10; G04F 10/00; A63K 1/00; A63K 3/00; A63K 3/02; A63K 3/023
See application file for complete search history.

(56) References Cited

U.S. PATENT DOCUMENTS

| | | | |
|---|---|---|---|
| 2015/0183528 A1* | 7/2015 | Walsh | B64F 1/32 701/3 |
| 2016/0321503 A1* | 11/2016 | Zhou | G06K 9/00637 |
| 2017/0038778 A1* | 2/2017 | Wang | G05D 1/0676 |
| 2017/0073085 A1* | 3/2017 | Tremblay | A47G 29/141 |
| 2017/0137150 A1* | 5/2017 | Conyers | B64F 1/007 |
| 2017/0217323 A1* | 8/2017 | Antonini | B60L 53/18 |
| 2017/0275025 A1* | 9/2017 | Johnson | B64F 1/362 |
| 2018/0036632 A1* | 2/2018 | Poynter | A63K 1/00 |
| 2018/0092484 A1* | 4/2018 | Lewis | A47G 29/141 |
| 2018/0265196 A1* | 9/2018 | Phillips | B64C 39/024 |
| 2018/0370652 A1* | 12/2018 | Vendrame | A47B 91/024 |
| 2019/0217968 A1* | 7/2019 | Schmidt | B64C 39/024 |

* cited by examiner

Primary Examiner — Robert T Clarke, Jr.
(74) Attorney, Agent, or Firm — Lee & Hayes, P.C.

(57) ABSTRACT

A launch platform may include sensor(s) that detect movement of a platform that supports an aircraft. The platform may move in response to departure of the aircraft from the platform. In response to a change in a signal or signal state of the sensor(s), a timer may initiate timing of a race. The timer may be stopped in response to a second or later change in a signal or signal state of the sensor(s). A target may extend above the platform and, when impacted by an aircraft, may cause the second or later change in the signal or signal state of the sensor(s). By using the target, the aircraft may stop the timer by impacting or colliding with the target rather than landing on the platform. In some embodiments, the launch platform may be configured to track time for a race that includes a predetermined number of laps.

20 Claims, 12 Drawing Sheets

SECTION A-A

REMOTE CONTROL AIRCRAFT RACE LAUNCH PLATFORM

BACKGROUND

Use of remote controlled aircraft have increased in popularity due to improved aircraft design and functionality, increased availability, and decreased prices. These remote controlled aircraft, also called drones or unmanned aerial vehicles (UAVs), are used by hobbyists for entertainment, photography, and for other recreation, such as racing. Some hobbyists race remote controlled aircraft for fun or in competitions. The competitions often have expensive and custom equipment that define a course for the race. However, such custom equipment lack flexibility and do not accommodate many needs for individuals that desire to race remote controlled aircraft in other venues, such as at home.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
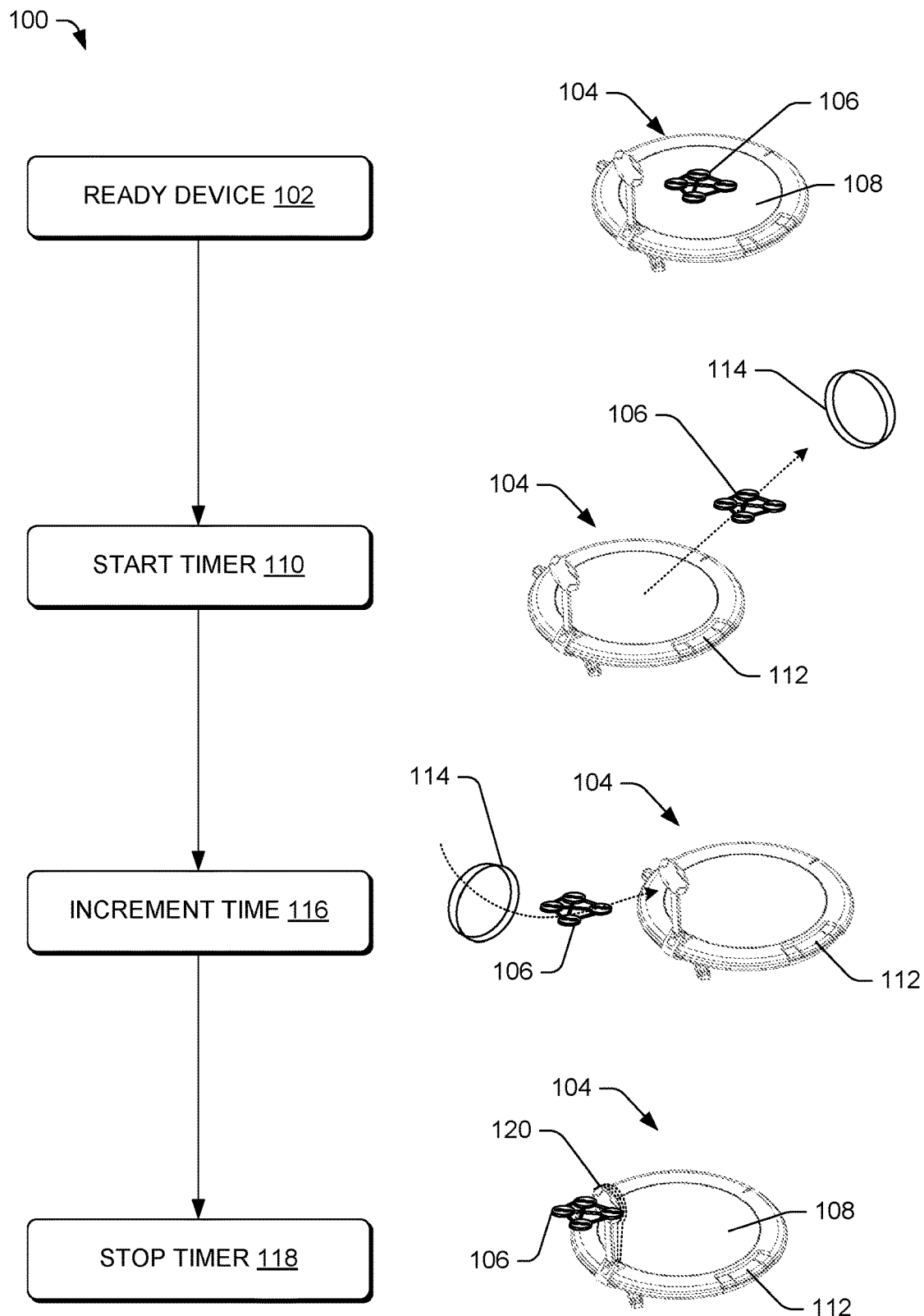
FIG. 1 is a pictorial flow diagram of an illustrative process of timing a race using a launch platform configured for use with remote controlled aircraft.

This disclosure is directed to a launch platform and air gates (or checkpoints) that collectively can be used to create a race course for remote controlled aircraft, such as rotorcraft including quadcopters or other rotorcraft. The launch platform may include one or more sensors that detect movement of a platform that supports an aircraft. The platform may move in response to departure of the aircraft from the platform. In response to a change in a signal or signal state of the sensor(s), a timer may initiate timing of a race by advancing time to track a duration of the race. The timer may be stopped in response to a second or later change in a signal or signal state of the sensor(s). For example, to complete a race, an aircraft may land on the platform, which may cause the change in a signal or signal state of the sensor(s), and thus cause the timer to stop advancing time. In some embodiments, a target may extend above the platform and, when impacted by an aircraft, may cause the second or later change in the signal or signal state of the sensor(s). By using the target, the aircraft may stop the timer by impacting or colliding with the target rather than landing on the platform. In some embodiments, the launch platform may be configured to track time for a race that includes a predetermined number of laps. The sensor(s) may determine a change in the signal or signal state, which may indicate a completion of a lap of the race, or an end of the race once the predetermined number of laps have been completed. For example, impact with the target may increment a lap count of a race. In some embodiments, the launch platform may perform a countdown to initiate a race.

In various embodiments, the launch platform may deploy the target after a start of the race. For example, the target may be recessed or stowed in or about the launch platform in order to avoid interference with aircraft that depart from the launch platform. After departure of the aircraft, the launch platform may deploy the target, such as by actuating a release mechanism that causes deployment of the target. The target may be biased toward a deployed position using springs and/or other basing devices to cause the target to transition from a stowed position to a deployed position. While in the deployed position, the target may be configured to sustain, without damage, repeated impacts or collisions with aircraft. The target, when impacted, may transfer impact forces to the launch platform which may be sensed by the one or more sensors. These forces may cause a change in a signal or signal state, which may be used to determine completion of a lap and/or completion of a race.

The launch platform may be configured to track multiple aircraft during a same race. The aircraft may be launched at a same time or at different times. The launch platform may determine different times or durations of time for each aircraft, such as by storing multiple times in response to multiple different signals associated with completion of a race. In some embodiments, the launch platform may identify an aircraft that has interacted with the launch platform, such as by scanning a barcode on an aircraft that identifies the aircraft, by reading information from a radio frequency identifier (RFID), which may be a passive RFID or an active RFID on the aircraft, and/or by determining other distinguishing features of the aircraft (e.g., different weight, different appearance, different sounds, etc.).

In some embodiments, the launch platform may include a radio, such as a Bluetooth® radio, a Wi-Fi radio, or a radio using other protocols to communicate with other devices, such as user devices (e.g., mobile smart telephones, tablet computers, laptop computers, etc.) and/or communicate with air gates (e.g., checkpoints along a race course). The air gates may define parameters of the race course and be configured to enable aircraft to fly through the air gates.

In various embodiments, an air gate may be configured to identify passage of an aircraft through the air gate, such as by deploying sensors that change a signal or signal state as a result of passage of an aircraft through the air gate. The signals may be generated by mechanical sensors that detect movement, optical sensors, electric sensors, and/or electromechanical sensors, which may be deployed to measure and change signal state in response to passage of an aircraft through the air gate. In some embodiments, the sensors may output signals that may indicate a distinction between an aircraft passing through the air gate and an aircraft contacting or impacting the air gate. The air gate may relay information to the launch platform, such as an indication of an aircraft passing through the air gate and/or contact between the air gate and an aircraft, which may be used to penalize the aircraft, for example, by adding penalty time to a total time for the aircraft.

The launch platform may include a display to display a time of the race and/or other information, possibly including text. The launch platform may include one or more controls configured to receive user input, such as a power button, a reset button, a menu button, and/or selection buttons. Other user interface controls may also be included, such as a touch screen interface, for example. In some embodiments, the launch platform may send information to a second device, such as a smart telephone or tablet computer, which in turn may generate an interface using the information. For example, the information may include times for aircraft competing in a race, among other possible information, such as lap information, penalty information, user information, and so forth.

The techniques and systems described herein may be implemented in a number of ways. Example implementations are provided below with reference to the following figures.

FIG. 1 is a pictorial flow diagram of an illustrative process 100 of timing a race using a launch platform configured for use with remote controlled aircraft. At 102, a launch platform 104 may be readied to initiate timing of a race. For example, the launch platform 104 may be powered on, may receive an input that indicates that a race will start soon. The launch platform 104 may determine a first signal or first signal state of one or more sensors included in the launch platform 104, which may output the first signal or the first signal state in response to a weight of an aircraft 106 depressing against a platform 108 sensed by the one or more sensors, for example. In some embodiments, the sensor(s) may include one or more limit switches. However, other types of sensors may be used to achieve similar results of detection of interaction between the launch platform 104 and the aircraft 106, such as Hall effect sensors to detect changes in magnetic fields, a strain gauge to detect material deformation, optical sensors, load cells, motion detectors, accelerometers, and/or other motion detection devices.

At 110, the launch platform 104 may detect the change in a signal or signal state of the sensor(s), which may indicate a second signal or second signal state. In response to the change in the signal or the signal state, the launch platform 104 may initiate a timer to track a duration of a race involving at least the aircraft 106, and possibly other aircraft. A display 112 may display an elapsed time after the start of the race. The aircraft 106 may progress through a race course that includes one or more air gates 114.

At 116, the timer may continue to increment time while the sensor(s) included in the launch platform 104 continue to output the second signal or second signal state. The display 112 may display an elapsed time and possibly other information. For example, in some embodiments, the launch platform 104 may be configured to track progress of the aircraft 106 through various air gates, such as the air gate 114.

At 118, the launch platform 104 may detect a change in a signal or signal state of the sensor(s), which may indicate a third signal or third signal state. In some embodiments, the aircraft 106 may land on the platform 108, or otherwise contact the platform, to cause the sensor(s) to indicate the third signal or third signal state. In various embodiments, the launch platform 104 may include a target 120 that extends above the platform 108. Contact by the aircraft 106 with the target 120 may cause the sensor(s) to indicate the third signal or third signal state. For example, contact with the target 120 may cause movement of the platform 108, which in turn may be detected by the sensor(s). However, the target 120 may also include one or more sensors.

In response to the change in the signal or the signal state (i.e., occurrence of the third signal or third signal state), the launch platform 104 may stop the timer to determine a total time of the race involving the aircraft 106, and possibly other aircraft. The display 112 may present the total time of the race. The display 112 may present other information, such as a user associated with the total time, a ranking of the time compared to other times recorded for the race, and/or other information. As an example, the launch platform 104 may save a number of fastest (top) times for a given race course, such as the top three times, the top five times, the top ten times, the top twenty times, or another predetermined number of times, which may be a leader board of users (racers). The launch platform 104 may also save a user, a race time, a date, and/or other information associated with each time that is saved. As a new total time is determined at the operation 118, the launch platform 104 may determine a position of the time relative to the saved times, and may display the position (or ranking), possibly along with other information.

Figure 2A:
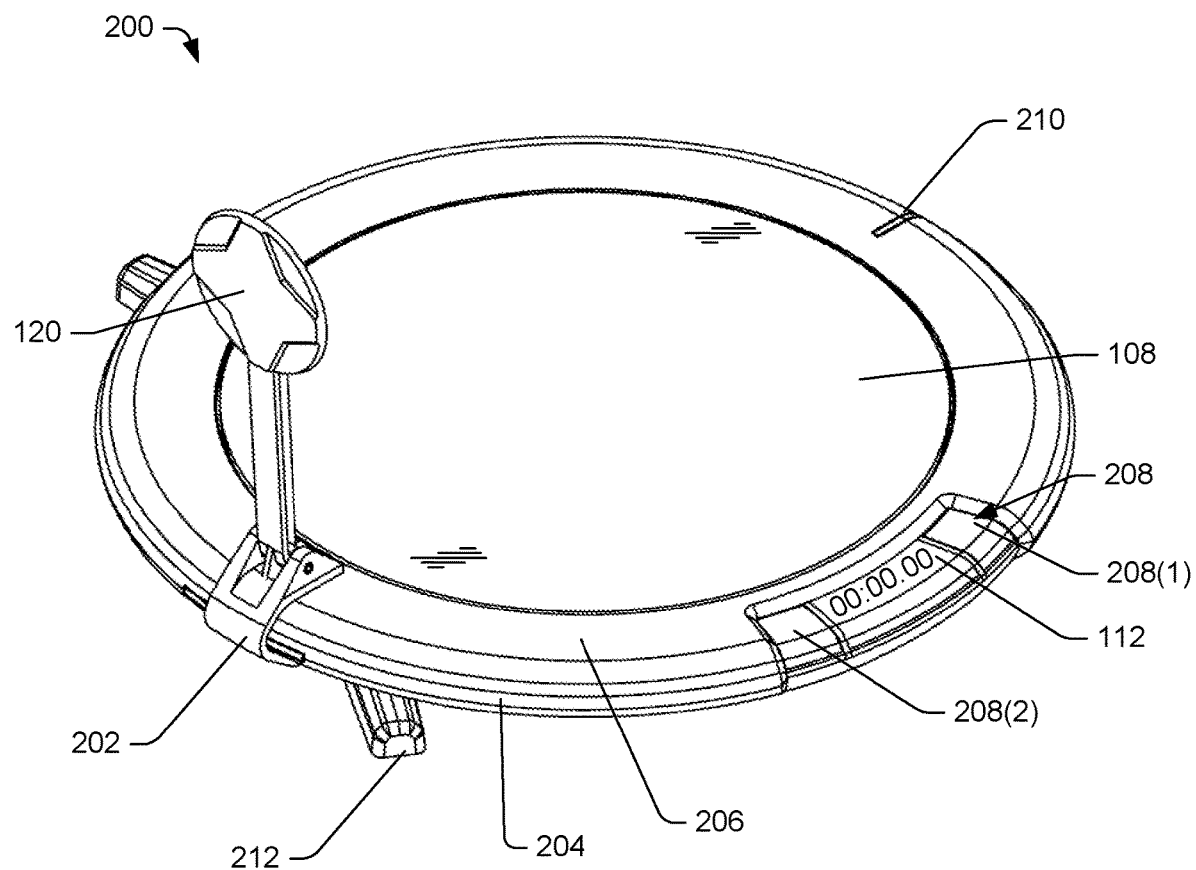
FIG. 2A shows a perspective view of an illustrative launch platform that may include a target that extends outward from a planar surface of the launch platform.

FIG. 2A shows a perspective view of an illustrative launch platform 200. The launch platform 200 may be the same or similar to the launch platform 104 described above.

As shown, the launch platform 200 may include the target 120 that extends outward from the platform 108 of the launch platform 200, possibly via a member that couples the target 120 to a target base 202. The target 120 may interface directly with the platform 108 or may contact the platform 108 after contact between the target 108 and an aircraft, such as described above with reference to operation 118 shown in FIG. 1. The target 120 may include the target base 202 that may selectively couple to a housing 204 of the launch platform 200, which may enable attachment and removal of the target 120, possibly without a use of any tools. In some embodiments, the target 120 may be coupled to different locations about the housing 204. The target 120 may interface with the target base 202 via a hinge or other feature that enables movement of the target 120 relative to the target base 202, such as to enable the target 120 to contact the platform 108 after being struck by an aircraft and/or to absorb an impact force of a collision to avoid damage to the target 120, the target base 202, and/or other parts of the launch platform 200. The target 120 may be formed of a rigid and durable material, such as a polymer or plastic, metal, or wood. In some embodiments, the target 120 may be formed, at least partially, of a soft material to prevent damage to an aircraft that contacts the target 120. The target may be biased in a position by a biasing device, such as a spring. The biasing device may be situated about a hinge, support the target 120 above the target base 202, or be positioned elsewhere. The target 120 may be configured to sustain repeated impacts from an aircraft, and used to cause movement of the platform 108 to enable counting of laps of a race and/or a detecting completion of a race.

The housing 204 may be formed in a disc shape or in other shapes. In some embodiments, the housing 204 may be substantially circular and resemble a flying disc. The platform 108 may be a generally planar surface that is configured for movement that is detectable by one or more sensors. For example, the platform 108 may interface with or near one or more sensors that detect movement of the platform 108. For example, the platform 108 may be suspended (e.g., biased) in a first position aligned with or proximate to a top surface 206 of the housing 204. For example, biasing devices, such as springs, may position the platform 108 proximate to the top surface 206 of the housing 204 when the platform 108 is not subject to other forces, such as a downward force of an aircraft resting on the platform 108. The one or more sensors may determine movement of the platform 108, which may be movable by compressing the biasing devices, possibly due to a weight of an aircraft resting on the platform 108 and/or contact by an aircraft with the platform (e.g., during landing). The one or more sensors may be implemented as limit switches, load cells, buttons, optical devices, and/or any other sensor type configured to detect movement of the platform 108 and/or the target 120. For example, the one or more sensors may be accelerometer(s) that detect movement of the platform 108, Hall effect sensors to detect changes in magnetic fields, or a strain gauge to detect material deformation. The platform 108 may be formed of a transparent material or opaque material, such as acrylic, or the platform 108 may be formed of other materials that resist scratching and are aesthetically appealing.

Changes in signals or signal states, as sensed by the one or more sensors, may cause the launch platform 200 to start a timer, stop the timer, and/or record a time of the timer. The display 112 may present a time and/or other information for viewing by users. For example, the time may be presented in a format such as mm:ss.xx, where "m" represents minutes, "s" represents seconds, and "xx" represents a fraction of a second. Other formats may be used. The display 112 may present text, possibly by scrolling text across the display to form or present words and/or other information.

The launch platform 200 may include one or more controls 208, such as a first control 208(1) and a second control 208(2). However, the launch platform may include more or fewer controls 208. The controls 208 may reset a time of the timer, may power on/off the launch platform, and/or control other operations of the launch platform described herein in this document.

In some embodiments, the launch platform 200 may include one or more lights 210. The lights 210 may convey information to users of the launch platform 200 and/or may provide entertainment or an aesthetic appeal. The lights 210 may change color to provide information about operation of the launch platform 200. For example, the lights 210 may emit a first color when the launch platform 200 is powered on, but not ready for a race. The lights 210 may emit a second color when the launch platform 200 is in standby mode and ready to detect a start of a race, which may commence when an aircraft moves from the platform 108. The lights 210 may emit a third color when the launch platform 200 is tracking time of a pending and ongoing race. Other colors may be associated with other events. Besides colors, different flashing patterns or steady light patterns may be used to convey information. In some embodiments, the lights may be used to perform a countdown to start a race, such as by changing from red, yellow, to green to indicate a race start countdown to users.

The housing 204 may be formed of any shape that accommodates support of the platform 108, which supports aircraft at least prior to commencement of a race. In some embodiments, the housing 204 may be sized to accommodate a platform 108 that can support multiple aircraft that are ready for a race. For example, four aircraft (or possibly more or fewer) may rest on the platform 108 and be ready to participate in a race. Although the housing 204 is shown in FIG. 2A as being round and generally planar in shape, the housing 204 may be formed in other shapes and/or sizes.

In some embodiments, the launch platform 200 may include a stand 212. The stand 212 may couple to the housing 204 and/or to another component of the launch platform 200. The stand 212 may support the launch platform 200 and may level the platform 108. For example, the stand 212 may include adjustable feet that enable a user to change a height of the feet to level the platform 108 and/or accommodate uneven surfaces, such as an uneven dirt surface that the stand 212 rests upon.

Figure 2B:
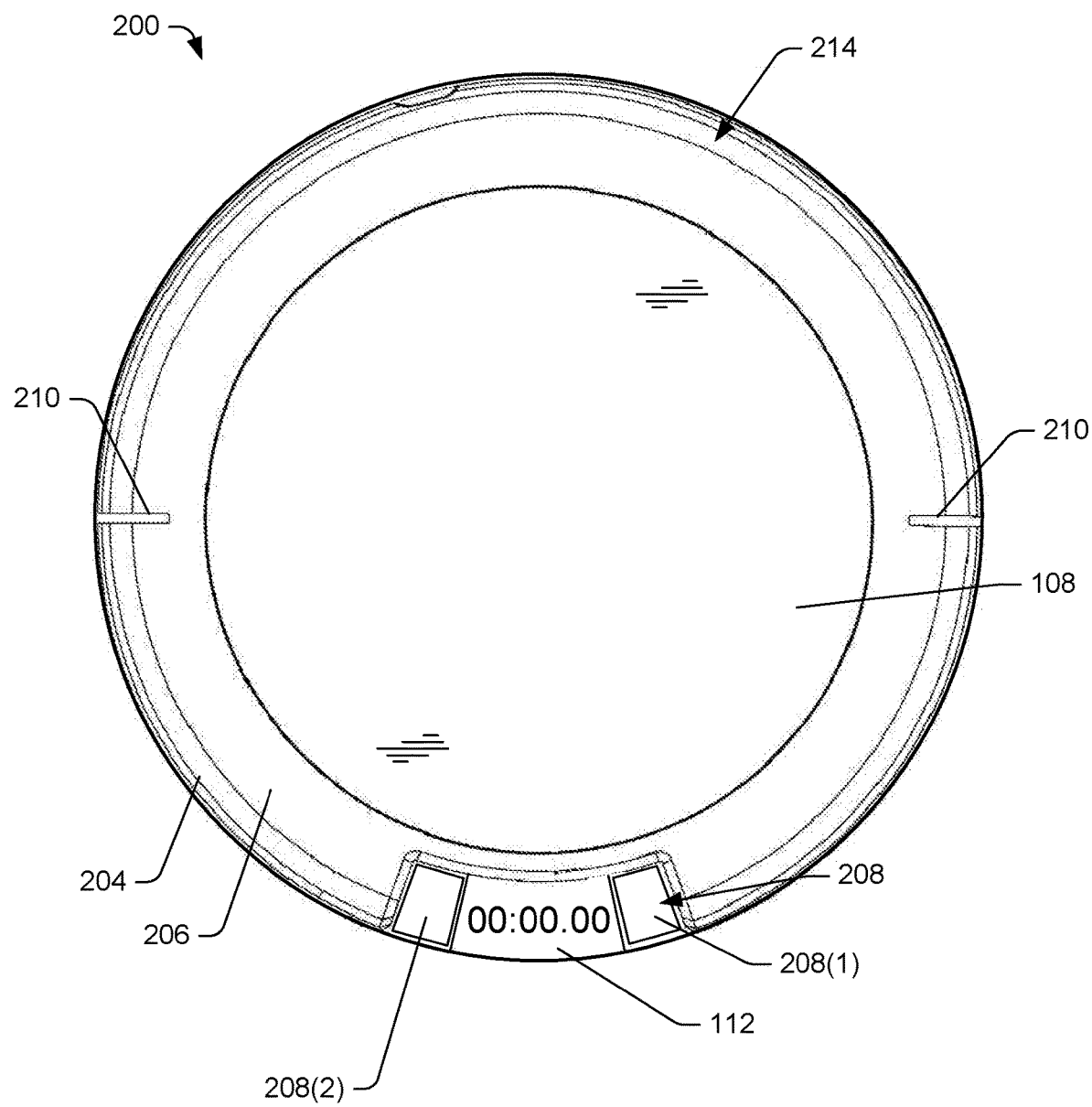
FIG. 2B is a top plan view of the illustrative launch platform shown in FIG. 2A.

FIG. 2B is a top plan view of the illustrative launch platform 200 shown in FIG. 2A. FIG. 2B omits the target 120 shown in FIG. 2A, for clarity purposes.

As shown in FIG. 2B, the launch platform 200 may include at least two lights 210. The lights 210 may operate independently and/or in unison, depending on a configuration of the launch platform and/or an intended use of the lights 210. In some embodiments, an outer perimeter 214 may include one or more additional lights, such as to light up the launch platform 200 in low light situations, such as for use at night or in a dark room.

Figure 2C:
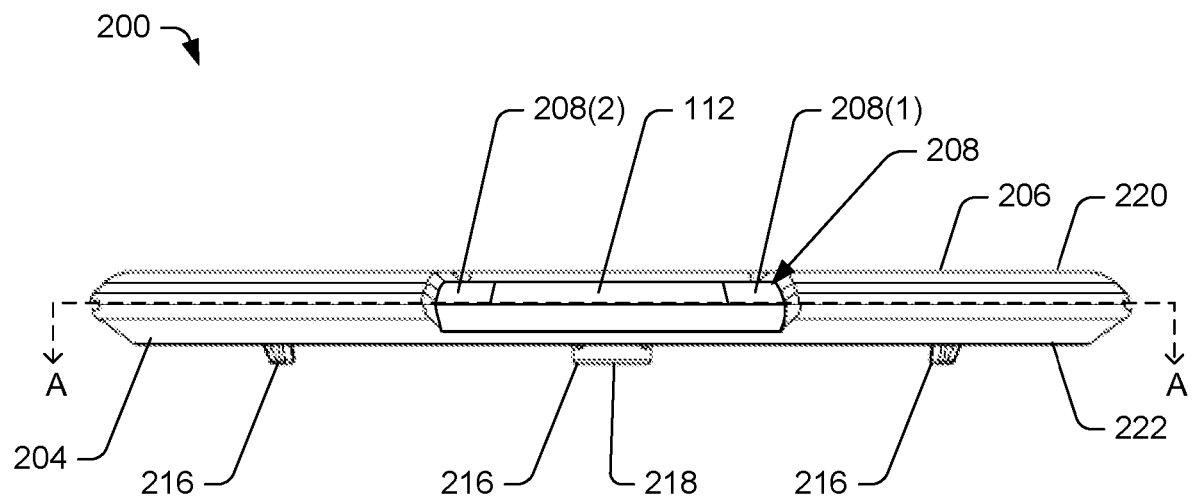
FIG. 2C is a side plan view of the illustrative launch platform shown in FIG. 2A.

FIG. 2C is a side plan view of the illustrative launch platform 200 shown in FIG. 2A. FIG. 2C omits the target 120 and the base 212 shown in FIG. 2A, for clarity purposes.

As shown in FIG. 2C, the launch platform 200 may include one or more bottom features 216. The bottom features may couple to the stand 212 shown in FIG. 2A. The bottom features 216 may act as feet, such as when the stand 212 is not used or not included with the launch platform 200. In some embodiments, at least one of the bottom features 216 may include a coupling feature 218 to securely couple to the stand 212 shown in FIG. 2A. The coupling feature 218 may enable removal of the stand 212, such as for transport of the launch platform 200. Other bottom features may or may not include a similar coupling feature.

The housing 204 may include an upper portion 220 and a lower portion 222, which may mate or couple to one another when assembling the launch platform 200 to contain internal components and/or for other purposes.

Figure 2D:
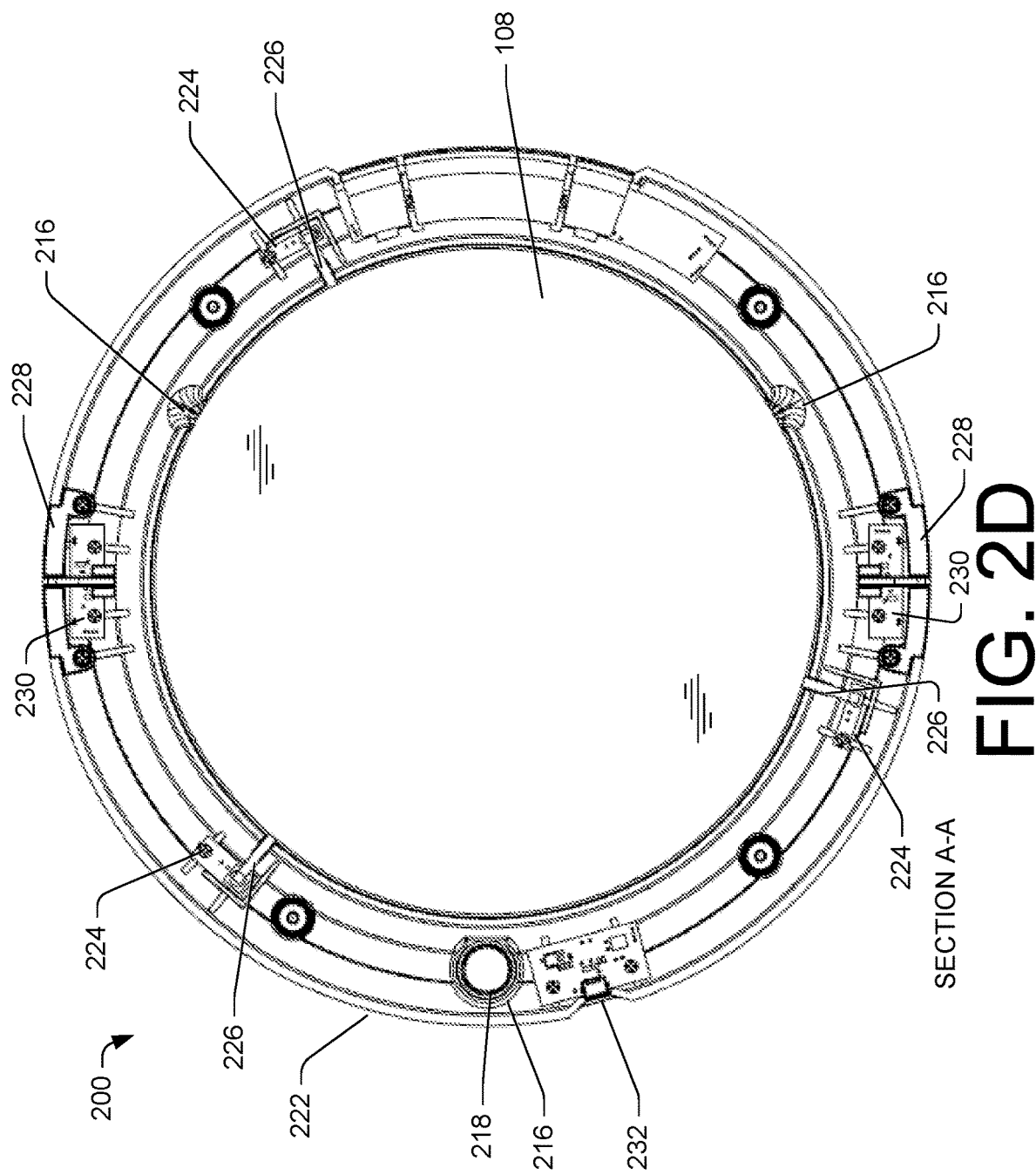
FIG. 2D is a top plan view of a cross sectional from FIG. 2C showing internal components of the illustrative launch platform.

FIG. 2D is a top plan view of a cross section A-A from FIG. 2C showing internal components of the illustrative launch platform 200. The cross-section A-A may represent the lower portion 222 of the housing 204. As shown, FIG. 2D includes the platform 108.

As shown in FIG. 2D, the launch platform 200 may include sensors 224. The sensors 224 may be limit switches that may sense movement or otherwise selectively engage arms 226 that extend outward from the platform 108. The arms 226 may be biased apart or away from the limit switches in some embodiments, which cause the arms 226 to avoid contact the limit switches except when the platform subject to forces, such as when an aircraft contacts the platform 108, for example. The limit switches may complete a circuit when in contact with the arms 226, or the presence of the arms 226 may break a circuit. Other configurations with limit switches or other sensors may be used to achieve similar results. Regardless of the configuration, the timer may be controlled by the limit switches or other sensors based on contact or lack of contact with the arms 226 and/or detected movement of the arms 226. Other types of sensors 224 may be used to detect movement of the platform 108 and/or the arms 226. Other examples of sensors are discussed throughout this disclosure.

In some embodiments, as few as a single sensor 224 may be used to detect movement of the platform 108. For example, the platform 108 may pivot on a first side opposite a second side that includes a single sensor in a configuration that uses only a single sensor (e.g., Hall effect sensor, limit switch, strain gauge, etc.). As another example, an accelerometer may be used to detect movement of the launch platform 200. Of course, multiple sensors 224 may be used, as shown in FIG. 2D. More than three sensors 224 may be used, such as four sensors, five sensors, or another number of sensors.

The launch platform 200 may include light piping 228 to direct light from a light source to an aperture formed in the housing 204, which may illuminate the light 210 shown in FIG. 2A. The light 210 may be apportion of the light piping 228. The light piping 228 may direct light to multiple apertures and/or may receive light from one or more light sources. The launch platform 200 may include a light source 230 to emit light into the light piping 228. The light source 230 may be a light emitting diode, for example. The launch platform 200 may include a power supply 232, which may include an adapter for an AC power source and/or an adapter for a DC power source.

Figure 2E:
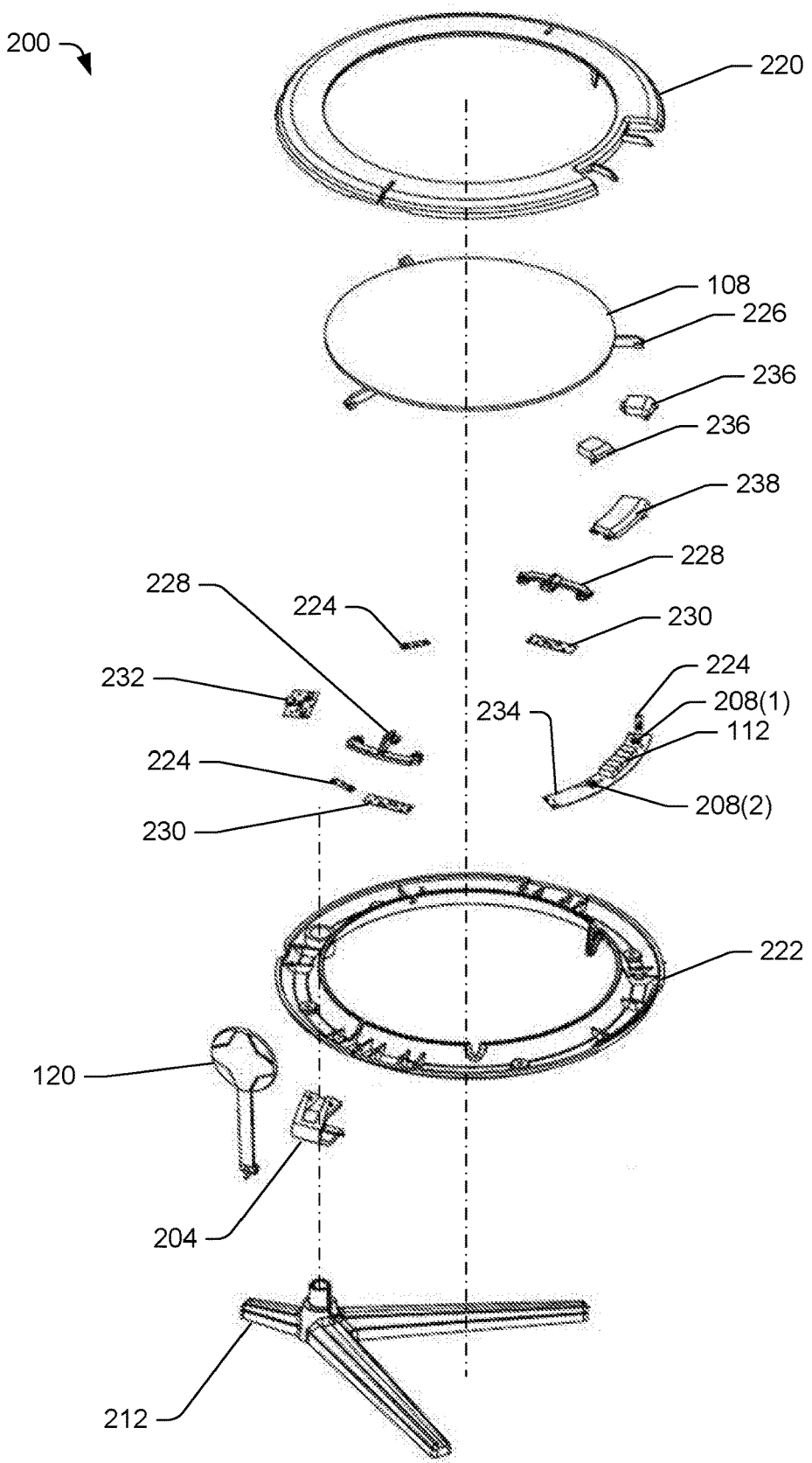
FIG. 2E is a perspective view of an exploded assembly of the illustrative launch platform shown in FIG. 2A.

FIG. 2E is a perspective view of an exploded assembly of the illustrative launch platform 200 shown in FIG. 2A. As shown in FIG. 2E, the launch platform 200 may include the sensors 224 that selectively interface with arms 226 of the platform 108. In some embodiments, a second sensor may be configured for activation by movement of the target 120, such as movement caused by collision of the target 120 by an aircraft. The sensor may send a signal to the timer to stop the timer or to register completion of a lap, depending on a configuration and/or operational mode of the launch platform 200.

The launch platform 200 may include a controller 234, which may include a timer and/or other logic and/or instructions. However, the timer may be separate from the controller in some embodiments. The controller 234 may be implemented as a logic board having different integrated components or components coupled to the logic board. The controller 234 may be in connection with the sensors 224, the second sensor 232, and/or the light sources 230 to provide power to these components and/or to receive signals from the components. The controller 234 may be in coupled to an I/O board. The I/O board may include the buttons 208 and the display 112. However, the buttons 208 and/or the display 112 may be separate from the controller 234 and/or separate from the I/O board. The buttons 208 may be activated by depressing a respective button cover 236. The display 112 may be visible under or through a display cover 238.

In some embodiments, the launch platform 200 may include other components described in this disclosure, such as a radio or other communication components to enable the launch platform 200 to communicate and/or exchange communications with other electronic devices, such as a smart telephone. The launch platform 200 may include a power source, such as a battery or a power adapter to receive AC power from an external source.

Figure 3A:
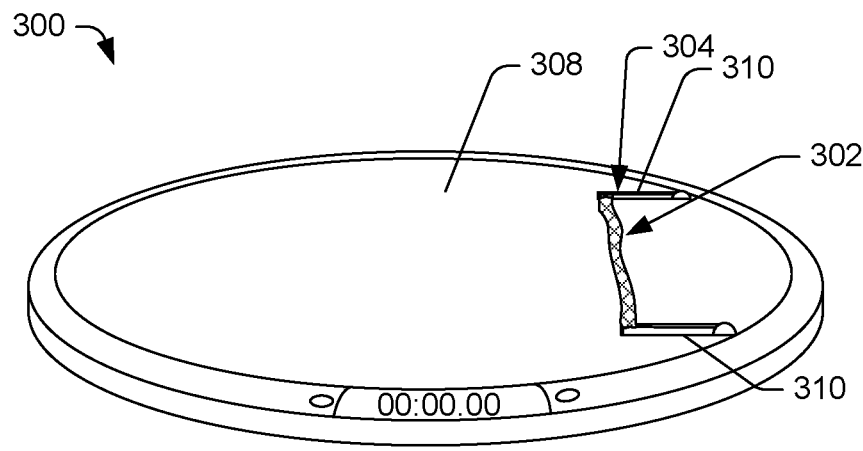
FIG. 3A shows a perspective view of another illustrative launch platform that includes a deployable target in a recessed position.

FIG. 3A shows a perspective view of another illustrative launch platform 300 that includes a deployable target 302 in a recessed position. The deployable target 302 may be stowed in the recessed position to make room for aircraft to be launched from the launch platform 300, or for other reasons (e.g. selective use, etc.). The deployable target 302 may operate in a similar way as the target 102 described with reference to FIG. 2A. The deployable target 302 may be configured to transition from a recessed position 304 shown in FIG. 3A to a deployed position 306 shown in FIG. 3B.

Figure 3B:
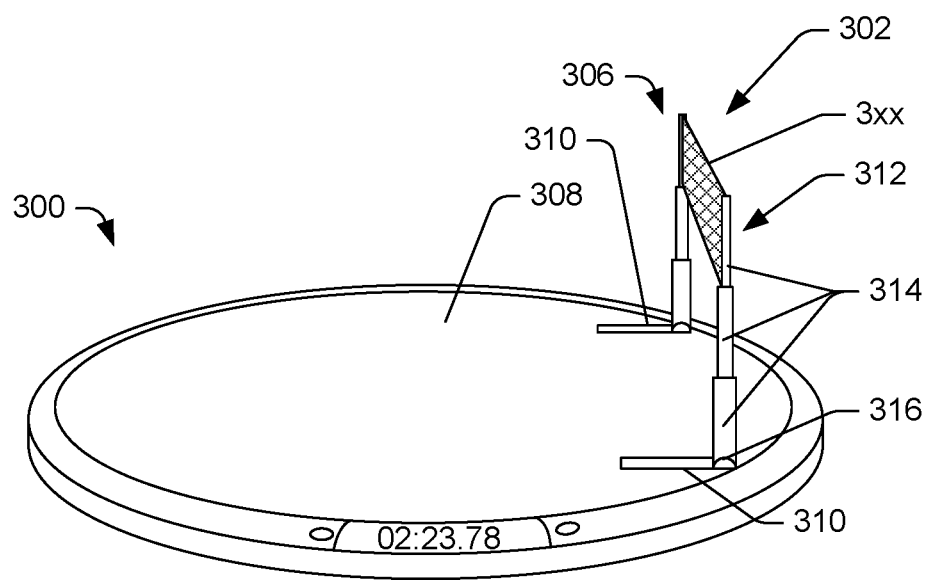
FIG. 3B shows a perspective view of the illustrative launch platform shown in FIG. 3A with the target deployed and extending outward from a platform of the launch platform.

FIG. 3B shows a perspective view of the illustrative launch platform 300 shown in FIG. 3A with the deployable target 302 in the deployed position 306 and extending outward from a platform 308 included in the launch platform 300. As shown in FIG. 3B, the platform 308 may include one or more recesses 310 or cavities that may receive the deployable target 302 in a pre-deployed state. The deployable target 302 may include a support 312, which may expand when deployed from a first, shorter length (shown in FIG. 3A) to a second, longer length (shown in FIG. 3B). For example, the support 312 may include various support members 314 that telescope and are biased outward when not otherwise constrained, such as constrained by the one or more recesses 310. The support members 314 may include members configured to extend in other ways, such as by pivoting about an axis.

After being deployed, the support 312 and possibly other supports may be compressed by a user and pushed into the recessed position to await another later deployment of the deployable target 302. The launch platform 300 may include logic and/or features to selectively deploy the deployable target 302. In some embodiments, a mechanical release may be triggered by a user to deploy the deployable target 302. In various embodiments, an actuator may receive a signal from a controller or logic board of the launch platform 300, which may cause deployment of the deployable target 302 without direct user action. For example, the deployable target 302 may be stowed in the recessed position 304 for the start of a race where aircraft are situated on the platform 308. After the race starts and the timer begins to track elapsed time, the launch platform 300 may deploy the deployable target 302 by transmitting a signal to an actuator, which may release a constraint that maintains the deployable target 302 in the recessed position 304. The deployable target 302 may bias toward the deployed position due to biasing devices included in the deployable target 302. The deployable target 302 may move or rotate about a pivot 316. The pivot point may enable transition between the recessed position 304 and the deployed position 306. In some embodiments, the pivot 316 may absorb an impact force caused by collision of an aircraft with a target member 318, which may be supported by the support 312 and possibly other supports. Thus, the deployable target 302 may be configured to absorb repeated collisions with aircraft, each collision being translated, by the deployable target 302, to movement of at least part of the launch platform 300, which is detected by one or more sensors to detect completion of a lap and/or completion of a race. The deployable target 302 may be configured, via the pivot, material selection, and/or other attributes, for repeated collisions, even repeated collisions during a same race.

The deployable target 302 illustrated in FIGS. 3A and 3B is just one example of a target that can transition between at least two different positions and states, where one state is configured for contact with an aircraft (e.g., the deployed position) and another state is configured to avoid contact with an aircraft (e.g., the recessed position).

FIGS. 4A-4E are perspective views of various air gate components that can be selectively used to form air gates for a race course that includes the launch platform.

Figure 4A:
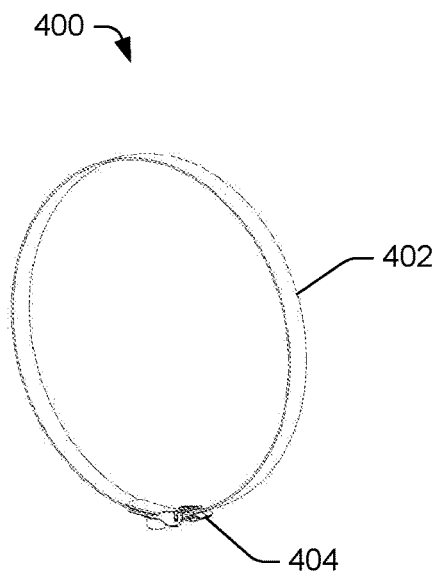
FIGS. 4A-4E are perspective views of various air gate components that can be selectively used to form air gates for a race course that includes the launch platform.
Figure 4B:
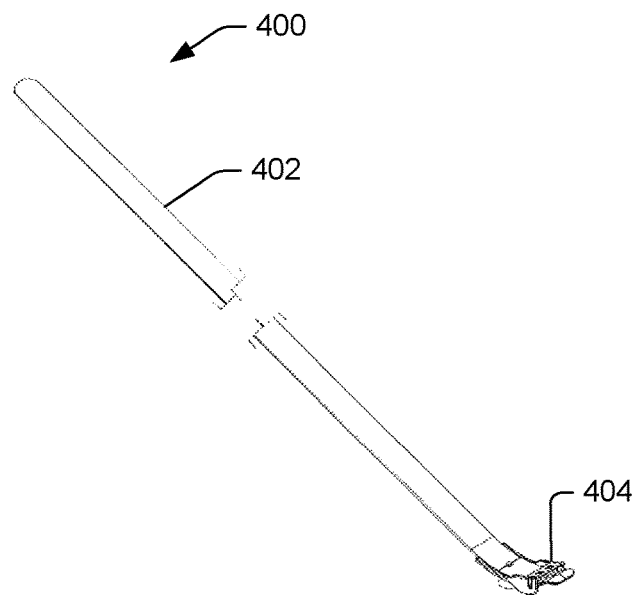

FIG. 4A shows a perspective view of an air gate 400, also referred to as a check point. The air gate 400 may include a strap 402 and a buckle 404. The strap may be deformable to enable changing a shape or size of the air gate. The buckle 404 may retain a size and shape of the strap 402, such as by coupling a first portion of the strap to a second portion of the strap. In some embodiments, the strap may be formed of a malleable material that has shape memory. For example, the material may include a wire or other material that can be deformed and retain a shape. In some embodiments, the strap 402 may be formed out of a polymer or plastic that resists permanent deformation. FIG. 4B shows a perspective view of the air gate 400 prior to buckling of the air gate.

Figure 4C:
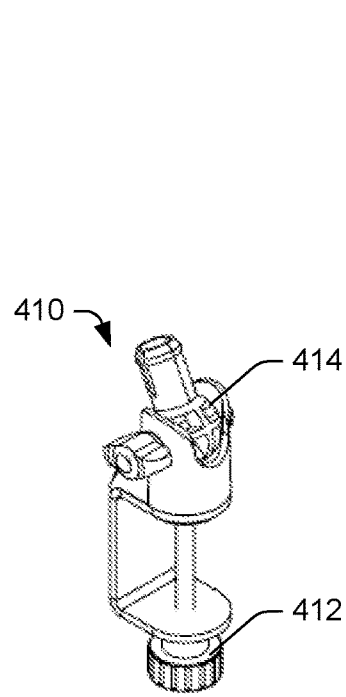

FIG. 4C shows a perspective view of the air gate vice 410. The air gate vice 410 may be configured to couple to the air gate or an intervening component (e.g., an air gate rod, etc.). The air gate vice 410 may selectively couple to an object via a vice mechanism 412. The air gate vice 410 may include a joint 414 to enable adjustment of an orientation of the air gate relative to the air gate vice 410.

Figure 4D:
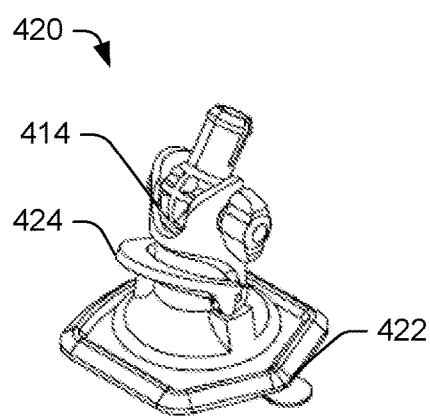

FIG. 4D shows a perspective view of an air gate suction cup 420. The air gate suction cup 420 may be configured to couple to the air gate or an intervening component (e.g., an air gate rod, etc.). The air gate suction cup 420 may selectively couple to an object (surface) via a suction mechanism 422. The air gate suction cup 420 may include a level 424 to engage/disengage the suction mechanism 422. The air gate suction cup 420 may include the joint 414 to enable adjustment of an orientation of the air gate relative to the air gate suction cup 420.

Figure 4E:
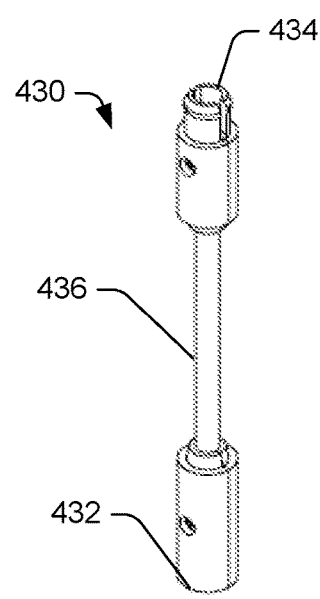

FIG. 4E shows a perspective view of an air gate extender 430. The air gate extender 430 may be an intervening component that situates the air gate 400 from the air gate vice 410 or the air gate suction cup 420. The air gate extender 430 may include a first end 432 to engage the air gate vice 410 or the air gate suction cup 420. The air gate extender 430 may include a second end to engage the air gate 400. The air gate extender 430 may include a body that may be deformed. The body may retain a deformation, such as to locate the air gate 400 in a specific orientation and/or location relative to the air gate vice 410 or the air gate suction cup 420.

Figure 5:
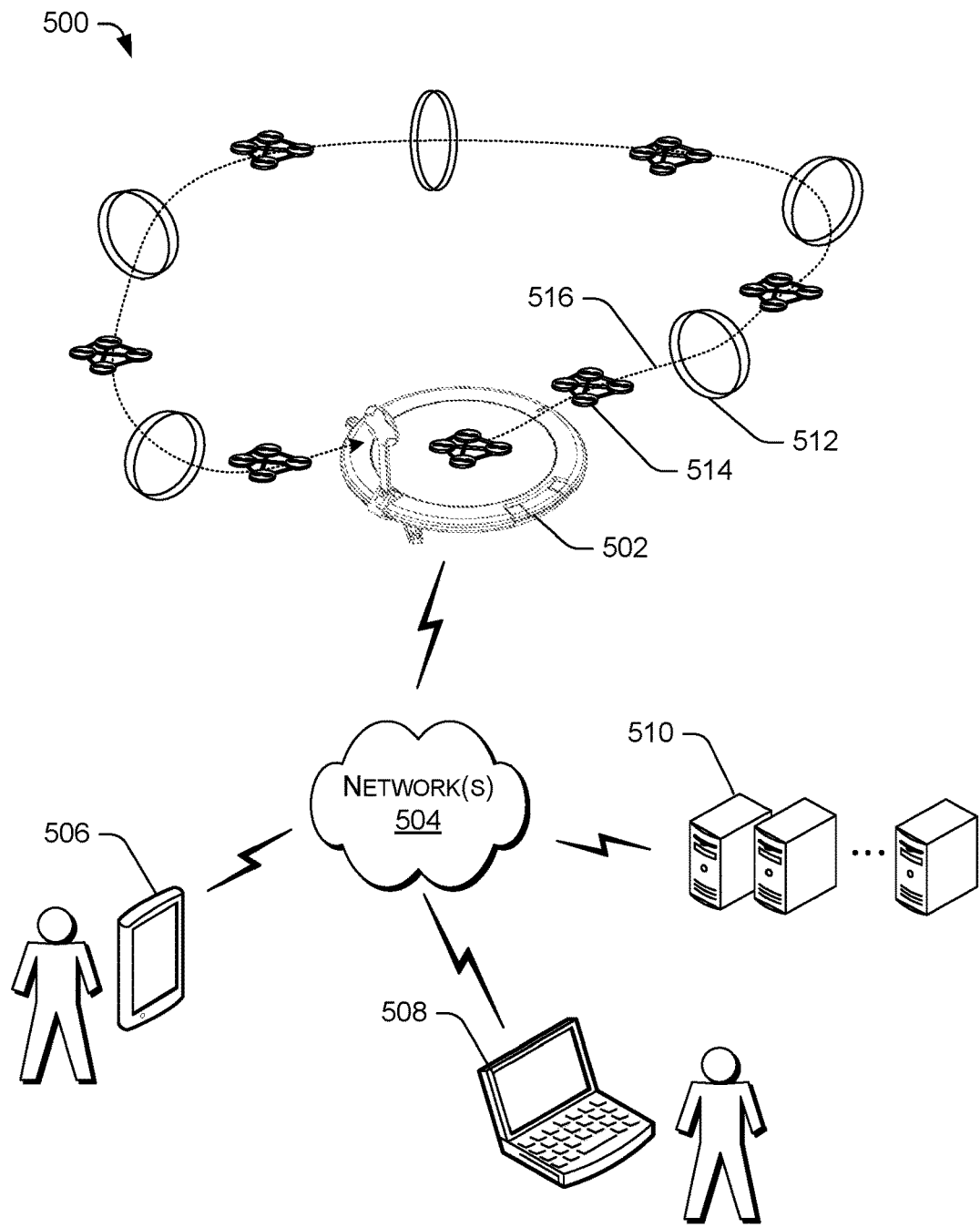
FIG. 5 is a schematic diagram of an illustrative system that includes a launch platform and air gates. The launch platform is configured with network connectivity to communicate with other devices.

FIG. 5 is a schematic diagram of an illustrative system that includes a launch platform and air gates. The launch platform is configured with network connectivity to communicate with other devices, such as user devices (e.g., smart telephones, tablet computers, laptop computers, servers, etc.) and/or race components, such as air gates. The air gates may be electronically configured with electronic components (e.g., motion detectors, lights, radios, RFID tags, etc.).

The system 500 may include a launch platform 502, which may be similar to the launch platform 104, 200 and/or 300 described above. The launch platform 502 may include a radio and/or other communication components to enable connectivity to other components via one or more networks 504. The network(s) 504 may include wired or wireless networks, via communication such as Bluetooth®, Wi-Fi, local area network, RFID, mobile telephone networks, Ethernet, and so forth. In some embodiments, the launch platform 502 may transmit or exchange data with a smart telephone 506. The smart telephone 506 may receive information from the launch platform 502, such as time information. The smart telephone 506 may supplement or perform functions of a display for the launch platform 502. The launch platform 502 may receive user input and/or selections via input received from the smart telephone 506. The system 500 may include a second computing device 508, such as a laptop computer or tablet computer (or other type of computing device) that may perform similar interactions with the launch platform 502. The launch platform 502 may provide information to or exchange information with computing devices 510, such as servers, possibly via an intervening device, such as the smart telephone 506 and/or the second computing device 508. The computing devices 510 may host a service to facilitate competitive races, standardized race courses, messages, fastest time lists, and/or other information, which may be at least partly populated with data generated by the launch platform 502.

In various embodiments, the launch platform 502 may communicate with air gates 512. For example, as an aircraft 514 moves about a race course route 516, the aircraft may pass through an air gate. The air gate 512 may include sensors, such as optical sensors, motion sensors (e.g., an accelerometer, etc.), and/or other sensors that detect passage of the aircraft through the air gate 512. In some embodiments, the air gate 512 may detect other information, such as contact with the aircraft, which may be used to implement a penalty, such as a penalty of disqualification and/or added time to a total time determined by the launch platform. The air gate 512 may include lights, speakers, and/or other input/output devices, which may be activated in response to events, such as an aircraft touching the air gate and/or passing through the air gate. The air gate may relay this information, and possibly other information to the launch platform 502 for further processing by the launch platform 502. Additional components of the launch platform 502 are discussed below, as well as illustrative operation of the launch platform 502 or other launch platforms described herein.

In some embodiments, the launch platform 502 may transmit information to another launch platform, such as an elapsed time of a race, a start signal, a synchronization signal, and/or other information. For example, a race may be conducted by using first launch platform as a starting point of the race and a second launch platform as an ending point of the race. In this configuration, the first launch platform may transmit information to the second launch platform or vice versa to enable calculation of an elapsed time of the race upon completion of the race (e.g., a total time to complete the race). The first launch platform, the second launch platform, or both, may track the elapsed time, such as by synchronizing the launch platforms for operation by transmission of at least one signal between the launch platforms.

Figure 6:
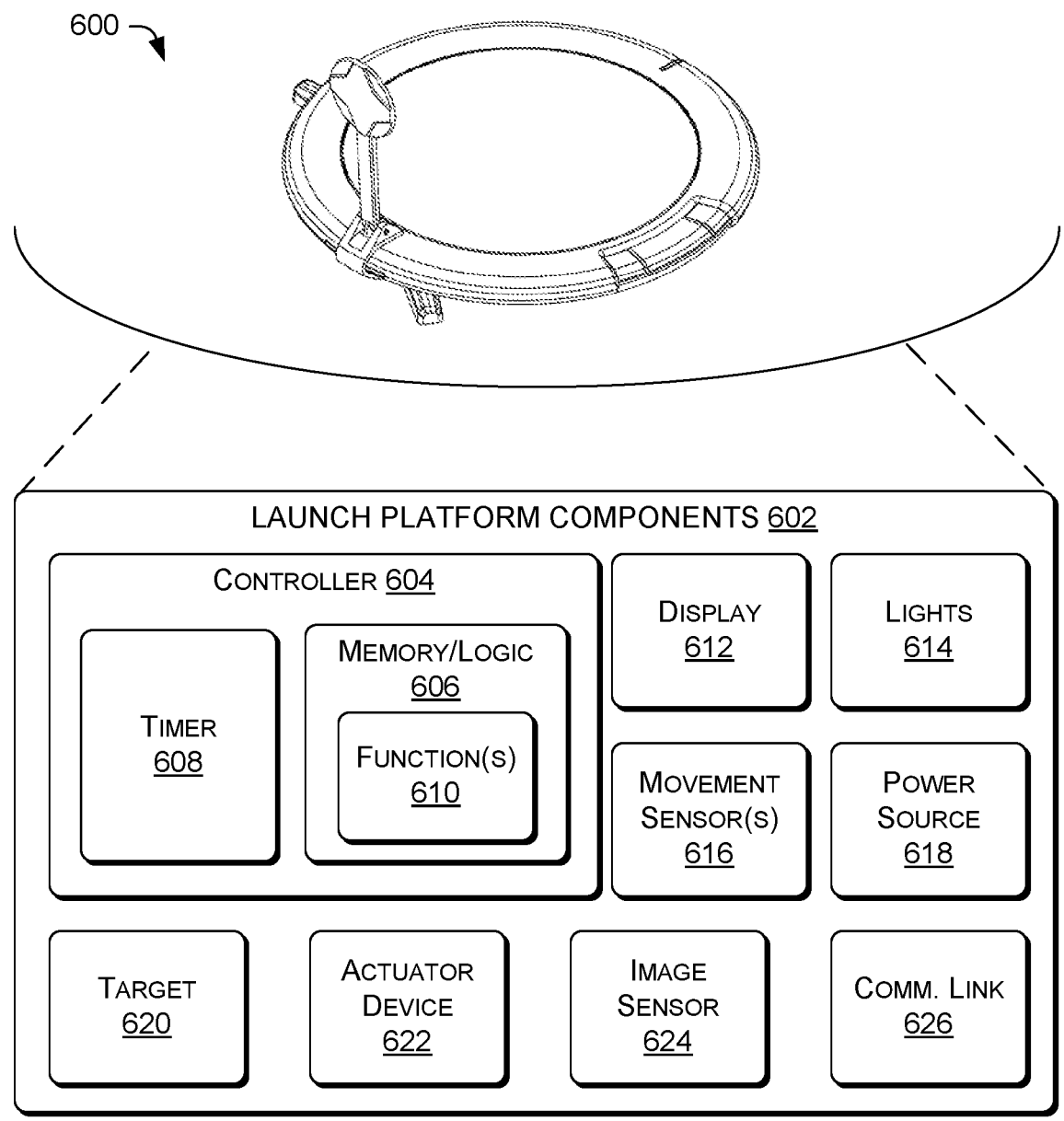
FIG. 6 is a block diagram of illustrative components of the launch platform.

FIG. 6 is a block diagram of illustrative components of a launch platform 600, which may be similar or the same as the launch platform 104, 200, 300 and/or 502 described above. The launch platform may include various components 602, but possibly not all the component shown in FIG. 6 and described below, depending on the configuration of the launch platform.

In some embodiments, the launch platform 600 may include a controller 604 that controls operation of the launch platform 600. The controller may include memory/logic 606, which may include logic to control a timer 608 and/or logic or instructions to perform other functions 610 described herein. For example, the functions 610 may include communications with other devices, control of lights or other I/O devices (e.g., speakers) and so forth.

The launch platform 600 may include a display 612 which may be controlled by the controller 604 to display information to a user or users. The display 612 may include a touch screen display to receive input from users. The launch platform 600 may include lights 614 which may be controlled by the controller 604. The launch platform 600 may include movement sensors 616 which may be in communication with the controller 604. The movement sensors 616 may include a limit switch, Hall effect sensor(s), a strain gauge, a load cell, an accelerometer, an optical sensor, and/or any other type of sensor that may detect movement of at least a portion of the launch platform due to interaction or contact with an aircraft, such as a remote controlled aircraft. Some movement sensors 616 may collect information that may distinguish between different aircraft, such as by weight, impact force, insignia on the aircraft, and/or in other ways. The launch platform 600 may include a power source 618, which may provide power to the launch platform and components thereof. The power source 618 may be a battery. In some embodiments, the power source 618 may provide power to battery chargers located about the launch platform. For example, a housing of the launch platform may include cavities and contacts to receive and charge batteries, such as batteries used to power remote controlled aircraft and/or other electronic devices.

In some embodiments, the launch platform 600 may include a target 620, such as the target 120 and/or the deployable target 302. When the target 620 is configured to be deployed, the launch platform 600 may include an actuation device 622 to selectively deploy the target 620. The actuation device 622 may be electronically controlled by the controller 604 and/or may be actuated by input received by a person (e.g., depression of a physical button, etc.).

In various embodiments, the launch platform 600 may include an image sensor 624, which may positively identify an aircraft and/or distinguish between different aircraft that are included in a race. For example, the image sensor 624 may be a scanner or barcode scanner that is configured to read an image code or other insignia on an aircraft when the aircraft is visible to the image sensor. The image sensor 624 may be situated below a clear platform (e.g., the platform 108 shown in FIG. 1) and configured to capture imagery during a race, and possibly before the race. In various embodiments, the launch platform 600 may include a communication link, such as a network adapter, a radio, and/or other communication components to enable transmission and/or exchange of information with other devices, such as electronic air gates and/or other computing device such as a laptop computer or smart telephone.

Figure 7:
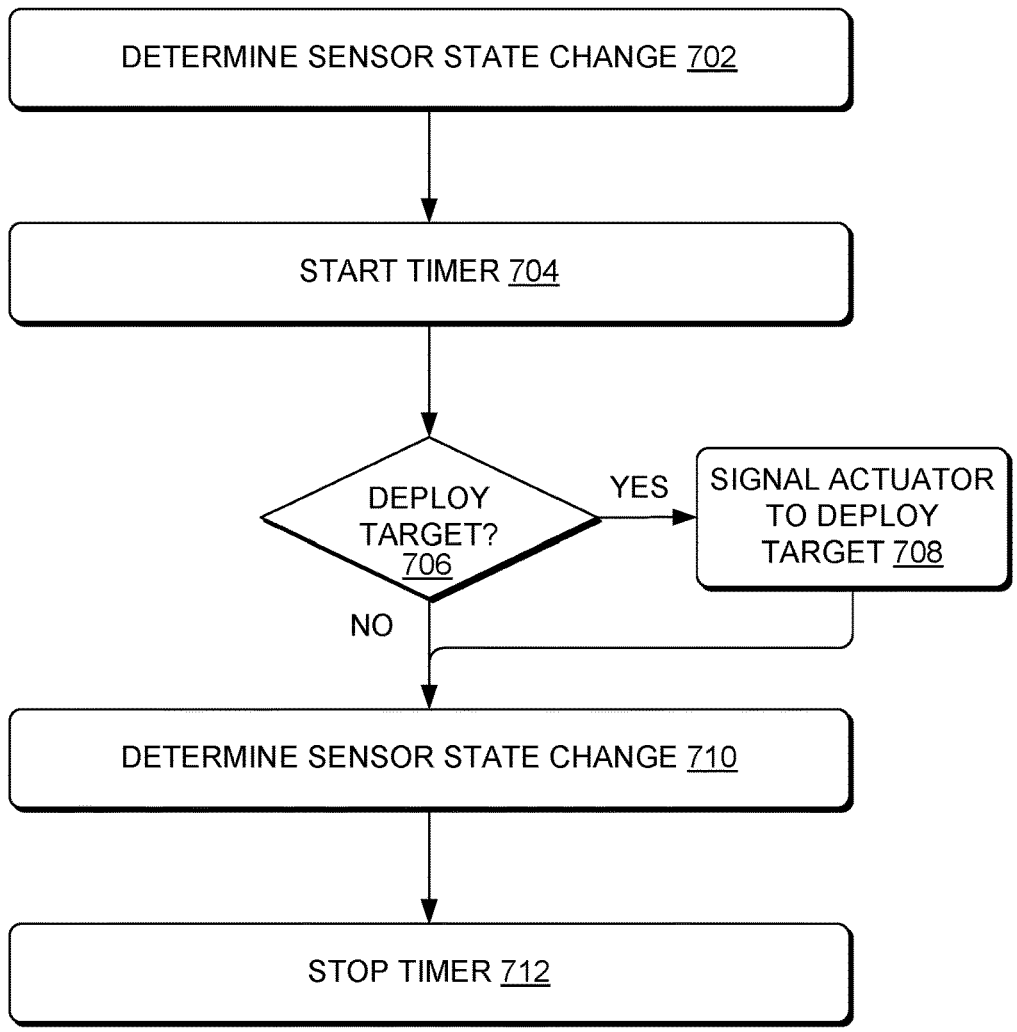
FIG. 7 is a flow diagram of an illustrative process to track a duration of a race and determine a completion time of the race using the launch platform.
Figure 8:
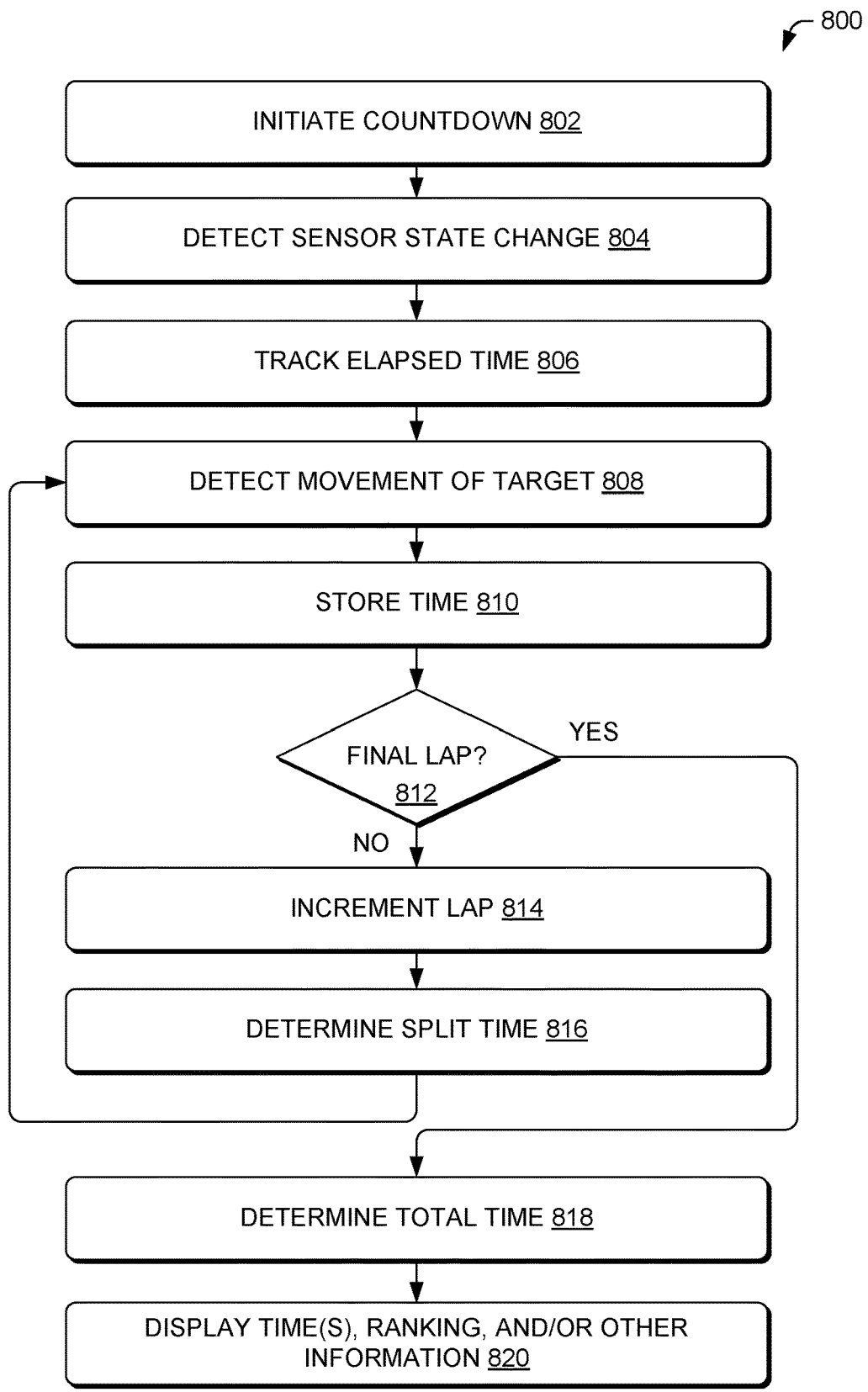
FIG. 8 is a flow diagram of an illustrative process to track a duration of a race that may include multiple laps and determine a completion time of the race using the launch platform.

FIGS. 7 and 8 show flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described below in the various processes may be mixed and matched depending on a particular configuration or logic deployed by a controller of a launch platform.

FIG. 7 is a flow diagram of an illustrative process 700 to track a duration of a race and determine a completion time of the race using the launch platform. The process 700 may be implemented by any of the launch platforms described herein, including the launch platforms 104, 200, 300, 502, and 600, and components thereof. Prior to the operations below, the launch platform may be powered on and in some embodiments, input may initiate a "ready-state" to detect a start of a race.

At 702, a controller (or logic) of the launch platform may determine a change in a signal or signal state of a sensor. For example, the sensor may be a limit switch that changes from a first state to a second state based on movement of a platform due to departure of an aircraft from the platform.

At 704, the controller may initiate a timer to begin timing a race. The timer may cause a display to show an elapsed time of a pending race.

At 706, the controller may determine whether to deploy a target, such as the deployable target 302 shown in FIGS. 3A and 3B. A decision to deploy a target may be received via a user input, such as during a set up process to set up a new race. However, a fixed or coupled target, such as the target 120 may also be used. When a target is to be deployed (following the "yes" route from the decision operation 706), the process 700 may advance to an operation 708.

At 708, the controller may send a signal to an actuator to deploy the target. Deploying the target may release a constraint that allows the target to bias to an extended and deployed position, which may be above the launch platform and capable of being impacted by an aircraft.

Following the operation 708, or when the target is not to be deployed (following the "no" route from the decision operation 706), the process 700 may advance to an operation 710. At 710, the controller of the launch platform may determine another change in a signal or signal state of a sensor after deployment of the target. The controller may be configured to ignore changes during deployment of the target, which may cause movement of the launch platform. For example, collision of an aircraft with the target and/or with the launch platform, possibly while landing the aircraft on the launch platform, may be determined at the operation 710.

At 712, the controller may stop the timer. The timer may show a total time of the race from the start of the race to a completion by a first participant of the race or only participant if only a single aircraft is participating in the race. To begin another race, the timer may be cleared.

FIG. 8 is a flow diagram of an illustrative process 800 to track a duration of a race that may include multiple laps and determine a completion time of the race using the launch platform. The process 800 may be implemented by any of the launch platforms described herein, including the launch platforms 104, 200, 300, 502, and 600, and components thereof.

At 802, the controller (or logic) may initiate a countdown to start a race. The countdown may be shown by a display via a timer, by lights, such as light sequencing colors of red, yellow, and green, and/or in other ways. The countdown may indicate a start of a race.

At 804, the controller of the launch platform may determine a change in a signal or signal state of a sensor. For example, the sensor may be a limit switch that changes from a first state to a second state based on movement of a platform due to departure of an aircraft from the platform.

The movement may be detected before the end of the countdown performed as part of the operation 802. The detected change at the operation 804 may be used to penalize a time of an early departing aircraft and/or to restart a race.

At 806, the timer may track elapsed time of a race, possibly starting at a conclusion of the countdown associated with the operation 802.

At 808, the controller of the launch platform may determine a movement of a target, such as the target 120 or the deployable target 302. The change may be a change in a signal or signal state of a sensor. For example, the target may be impacted by an aircraft participating in the race.

At 810, a time associated with the movement of the target (caused by an impact or collision with an aircraft in the race) may be displayed and/or stored. In some embodiments, a race may include multiple laps. A number of laps for a race may be a received input by the controller, based on user input, for example. In some embodiments, the controller may transmit a signal to the electronic timer to pause the display of the elapsed timer to show a lap/split time, and/or may transmit a signal to the electronic timer to cause the display of the elapsed timer to display the current elapsed time. In various embodiments, the controller may transmit a first signal to the lap counter to start tracking laps, transmit a second signal to the lap counter to stop tracking laps, and transmit a third signal to the lap counter to reset the lap counter and/or clear the lap counter display.

At 812, the controller may determine whether the race is on a final lap. For example, the controller may store a predetermined number of laps for a race and may track progress of completion of the laps based on detected movement of the target via the operation 808. When the lap is not a final lap (following the "no" route from the decision operation 812), then the process 800 may advance to an operation 814 for continued processing of additional laps of the race.

At 814, the controller may increment a count of the laps by one.

At 816, the controller may cause display of a time split for a last lap and/or other information, such as a difference in time splits and/or other information. Following the operation 816, the process 800 may continue to the operation 808 described above to count other lap(s) of the race.

When the lap is a final lap (following the "yes" route from the decision operation 812), then the process 800 may advance to an operation 818 in response to completion of the race. At 818, the controller may determine a total time for the race. At 820, the controller may cause the display to present time information, including the total time, splits for laps, and/or other time information. The controller may cause the display to present ranking information, which may compare previously stored times for the race course in comparison to the total time, and possibly other ranking or metrics associated with information stored by the controller. The controller may cause the display to present other information, such as a user that won the race and/or other information about the race or status of the launch platform.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A launch platform device configured to track time associated with a race of remote controlled aircraft, the launch platform device comprising:
   a housing that includes a base coupled to a substantially planar platform configured to support a remote controlled aircraft;
   one or more sensor coupled to the housing, the one or more sensor configured to output a switch signal in response to engagement, directly or indirectly, by the platform in response to movement caused by interaction with the remote controlled aircraft;
   an electronic timer to track elapsed time;
   a controller in communication with at least the electronic timer and the one or more sensor, the controller to control operation of the electronic timer based at least in part on changes in the switch signal, the controller including logic to:
      transmit a first signal to the electronic timer to start tracking elapsed time,
      transmit a second signal to the electronic timer to stop tracking the elapsed time, and
      transmit a third signal to the electronic timer to reset the electronic timer and clear the elapsed time;
   a display coupled to the housing and in communication with the electronic timer, the display to output the elapsed time from the electronic timer; and
   a power supply to supply power to at least one of the controller, the display, the electronic timer, or the one or more sensor.

2. The launch platform device as recited in claim 1, further comprising a target structure including a target base configured to selectively couple to the housing, the target structure including a member having a first end coupled to the target base and a second end coupled to a target body to position the target body above the platform, the target structure configured to translate a force of impact of the remote controlled aircraft with the target body into movement of the platform to cause the engagement with at least one of the one or more sensor.

3. The launch platform device as recited in claim 2, wherein the housing includes a cavity to stow the target structure, and wherein the target structure includes at least one hinge to enable the member to selectively move relative to the platform and toward the cavity.

4. The launch platform device as recited in claim 1, further comprising a plurality of lights in communication with the controller, wherein the controller controls power to the lights to activate or deactivate the lights in response to at least one of:
   changes in the switch signal, or
   a countdown to initiate a race.

5. The launch platform device as recited in claim 1, wherein housing includes a disc shape and the platform includes a profile that is substantially circular.

6. The launch platform device as recited in claim 1, further comprising a radio configured to at least transmit information to another electronic device or another launch platform device.

7. The launch platform device as recited in claim 1, further comprising an image sensor to capture an electronically-readable identifier on an aircraft.

8. The launch platform device as recited in claim 1, further comprising memory to store at least one prior time associated with a prior race, and wherein the controller includes logic to:

rank the elapsed time in relation to the at least one prior time, and cause the display to output the rank.

9. An apparatus comprising:

a housing that includes a base coupled to a substantially planar platform configured to support a remote controlled aircraft;

at least one sensor coupled to the housing, the at least one sensor configured to detect movement of the housing and output a switch signal in response to the movement caused by interaction with the remote controlled aircraft; and a controller in communication with the at least one sensor, the controller including a timer to track elapsed time associated with a race involving the remote controlled aircraft, the controller to control the timer based at least in part on changes in the switch signal, the controller including at least one of logic or processor instructions to:

start tracking an elapsed time in response to a first instance of the switch signal, and stop tracking the elapsed time in response to a second instance of the switch signal.

10. The apparatus as recited in claim 9, further comprising a display coupled to the housing and in communication with the controller, the display to output the elapsed time generated by the timer.

11. The apparatus as recited in claim 9, further comprising a radio to transmit information to a different electronic device, the information including at least the elapsed time, and wherein the different electronic device is configured to display at least the elapsed time.

12. The apparatus as recited in claim 9, further comprising a target structure including a target base configured to selectively couple to the housing, the target structure including to a target body coupled to the target base and positioned above the platform, the target body configured to translate a force of impact of the remote controlled aircraft into the movement of the housing.

13. The apparatus as recited in claim 12, wherein the target body includes a biasing device to absorb at least a portion of the force of impact and allow the target body to move between a default position above the platform and a position in contact with the platform, and wherein the controller further includes at least one of logic or processor instructions to count completion of a lap of the race in response to at least one movement of the target body.

14. The apparatus as recited in claim 12, further comprising an actuator to move in response to receipt of a signal from the controller, the actuator to move to release a constraint that constrains the target structure in a stowed position, wherein the target structure includes a biasing device to bias the target structure toward a deployed position such that the target body is positioned above the platform.

15. The apparatus as recited in claim 9, further comprising a radio to receive information from a different electronic device, the information including at least location information associated with the remote controlled aircraft, the different electronic device including at least one of:

a different launch platform that includes another controller, or an air gate device that detects presence of the remote controlled aircraft though or proximate to the air gate device.

16. The apparatus as recited in claim 9, wherein the at least one sensor includes at least one of a limit switch, a load cell, or an accelerometer.

17. A system comprising:

a launch platform including:

a housing that includes a base coupled to a substantially planar platform configured to support a remote controlled aircraft;

at least one sensor coupled to the housing, the at least one sensor configured to detect movement of the housing and output a switch signal in response to the movement caused by interaction with the remote controlled aircraft; and a controller in communication with the at least one sensor, the controller including a timer to track elapsed time, the controller to control the timer to track an elapsed time of a race based at least in part on changes in the switch signal; and a plurality of air gates that define boundaries for travel of the remote controlled aircraft during the race at least one of before or after the remote controlled aircraft interacts with the launch platform.

18. The system as recited in claim 17, further comprising a radio to transmit information to another launch platform, the information including a signal associated with at least the elapsed time of the race.

19. The system as recited in claim 17, further comprising a display to output the elapsed time, the display to receive information from the controller by at least one of a wired connection or wireless connection.

20. The system as recited in claim 17, further comprising a target structure including a target base configured to selectively couple to the housing of the launch platform, the target structure including a target body coupled to the target base to position the target body above the launch platform, the target structure configured to translate a force of impact of the remote controlled aircraft with the target body into movement of the platform.

* * * * *